United States Patent [19]

Saito et al.

[11] Patent Number: 4,752,782

[45] Date of Patent: Jun. 21, 1988

[54] METHOD AND APPARATUS FOR THERMAL-ELECTROSTATIC INK JET RECORDING

[75] Inventors: Koichi Saito; Yoshihiko Fujimura; Nanao Inoue, all of Kanagawa, Japan

[73] Assignee: Fuji Xerox Co., Ltd., Kanagawa, Japan

[21] Appl. No.: 30,439

[22] Filed: Mar. 26, 1987

[30] Foreign Application Priority Data

Mar. 27, 1986 [JP] Japan .................................. 61-67305

[51] Int. Cl.[4] .............................................. G01D 9/00

[52] U.S. Cl. ....................................... 346/1.1; 346/75; 346/140 R; 400/126

[58] Field of Search .............. 346/75, 140 R, 140 PD, 346/1.1, 153.1, 155, 159; 400/126

[56] References Cited

FOREIGN PATENT DOCUMENTS 58-69069 4/1983 Japan .................................... 346/75
59-225984 12/1984 Japan .................................... 346/75
60-90775 5/1985 Japan .............................. 346/16 PD
60-131251 7/1985 Japan .............................. 346/16 PD
1484368 9/1977 United Kingdom ........... 346/16 PD

*Primary Examiner*—E. A. Goldberg
*Assistant Examiner*—Huan H. Tran
*Attorney, Agent, or Firm*—Finnegan, Henderson, Farabow, Garrett & Dunner

[57] ABSTRACT

A method of ink jet recording wherein thermal and electric energies are applied to a liquid coloring agent, such as ink, to jet the ink toward a recording member, such as paper. A plurality of spaced apart electric heating resistor and lead electrodes are used to heat the ink and are in direct contact with the ink which has a high electrical resistivity, e.g., a volume resistivity of at least about $10^6\Omega\cdot$ cm. Also, there may be used a plurality of spaced apart electric field forming electrodes to apply an electric field to the ink having sufficient electrical resistance to prevent leakage across the electrodes.

5 Claims, 5 Drawing Sheets

METHOD AND APPARATUS FOR THERMAL-ELECTROSTATIC INK JET RECORDING

FIELD OF THE INVENTION

This invention relates to method and apparatus for non-impact recording of an image by jetting a liquid coloring agent such as ink at a recording member.

BACKGROUND OF THE INVENTION

Non-impact recording by the ink jet method is becoming popular for converting image data in the form of electrical signals into hard copies because fewer moving parts are required and less noise is produced than with impact recording. The ink jet method is also considered particularly useful because ordinary paper can be used without need for a special process, such as fixing, for recording purposes.

The ink jet method that is already in use comprises the steps of filling an airtight container with ink, applying a pressure pulse thereto, and sending the ink out of the orifice of the container in a jet for recording purposes. An ink jet recorder for the aforesaid method cannot be made compact because of its operating mechanism and requires mechanical scanning if recording has to be made with a desired image density. This latter requirement greatly reduces the recording speed. At the same time, there have been proposed techniques for remedying shortcomings inherent in the ink jet method and making high-speed recording possible.

A method using magnetic ink is an example of an alternate method. In this method magnetic ink is provided close to a magnetic electrode array to form an ink-jet state corresponding in position to a picture element by making use of a swell of the ink in the presence of a magnetic field, and jetting the magnetic ink in the presence of a static electric field. Since this method admits of electronic scanning, higher-speed recording becomes possible. The method has inherent disadvantage in constraints on the selection of ink and the coloration characteristic of the ink.

There is also known a so-called plane ink method, which comprises arranging ink in a slitlike inkholder in parallel to an electrode array, and jetting the ink in accordance with an electric field pattern formed between the electrode array and a backing electrode a supporting a recording paper. Since no minute orifice is required in this method, the problem of ink clogging can be prevented. However, a high voltage must be applied to jet the ink which makes it necessary to drive the electrode array on a time division basis to prevent a voltage leak across adjoining or neighboring electrodes. This also places restraints on the recording speed attainable with such a device.

A so-called heat bubble jet method has also been proposed for jetting ink out of an orifice by means of thermal energy. In this method, the ink is abruptly heated to cause film boiling and a pressure rise resulting from the rapid formation of bubbles within the orifice is utilized to jet the ink. The film boiling temperatures are as high as 500°-600° C., however, and this makes it difficult to put this method to practical use because ink properties tend to change at elevated temperatures and a protective layer on the heating resistors is deteriorated by high temperature.

As clear from the above, prior ink jet recordings methods have many unsolved problems. The problems include unsatisfactory recording speed, the requirements of special inks and complicated driving means, and thermal deterioration of the ink and the heating means.

OBJECT AND SUMMARY OF THE INVENTION

The present invention is intended to solve the above problems and it is therefore an object of the invention to provide an image device and method for recording images at high speed by the selective jetting of ink.

The present invention provides an image recording method wherein both electric and thermal energies are applied to a liquid coloring agent arranged in an image recording head to let fly, or jet, the liquid coloring agent located in the area to which both the energies have been applied, which method comprises applying thermal energy to the liquid coloring agent with a plurality of spaced apart electric heating resistors and lead electrodes for supplying the heating resistors; and applying to the liquid coloring agent electric energy by applying an electric field thereto; the liquid coloring agent being directly in contact with the heating resistors and lead electrodes and having a selected high electrical resistivity such that leakage does not occur across the electrodes. Advantageously, the agent has a volume resistivity of at least about $10^6\Omega\cdot$cm.

Further in accordance with the present invention, an image recording head is provided wherein both electric and thermal emergies are selectively applied to portions of a liquid coloring agent to jet the liquid coloring agent to which both the emergies have been applied. The image recording had comprises electric energy applying means for applying a uniform electric field to the liquid coloring agent, the electric energy applying means including an electric field forming electrode, a backing electrode adapted to support a recording medium, and a first power supply for establishing a voltage drop between the electric field forming electrode and the backing electrode, and thermal energy applying means comprising a plurality of heating elements in contact with the liquid coloring agent, and electrode means for supplying current to selected heating resistors to heat the liquid coloring agent at selected locations to a temperature to jet droplets of the agent from the selected location toward the backing electrodes in cooperation with the electric field, and wherein the liquid coloring agent comprises ink having a volume resistivity greater than $10^{6\Omega\cdot cm}$.

A plurality of heating resistors or elements, for instance, are arranged in the form of an array and allowed to contact a liquid coloring agent. The heating element located in a position corresponding to a recording picture element is selectively heated in response to an image signal and a uniform electric field is applied to the whole liquid coloring agent. Thus, the liquid coloring agent is caused to jet at a recording member. One picture element is recorded for each setting of the agent. By the repetition of the aforesaid process, a picture element train in the form of a line is recorded and, by scanning the recording member, an image can be recorded.

Recording can be made likewise with a plurality of electric field forming electrodes for locally applying an electric field while the liquid coloring agent is uniformly heated at a predetermined temperature. The use of a liquid coloring agent whose electric resistance is greater than a certain minimum level can prevent shorting between the electrodes even though the liquid coloring agent directly contacts the array of heating resistors and corresponding lead electrodes. It thereby becomes unnecessary to cover each lead electrode with an insulating layer and the liquid coloring agent can be heated efficiently. High-speed recording also becomes possible because the ink temperature can be quickly raised.

BRIEF DESCRIPTION OF THE DRAWINGS

The present invention will be fully understood when the following detailed description is considered with reference to the accompanying drawings wherein.

DETAILED DESCRIPTION

Figure 2A:
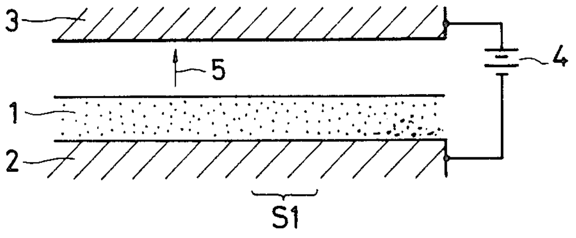
FIGS. 2(A)–2(C) are schematic diagrams illustrating the recording principle of the present invention.
Figure 2B:
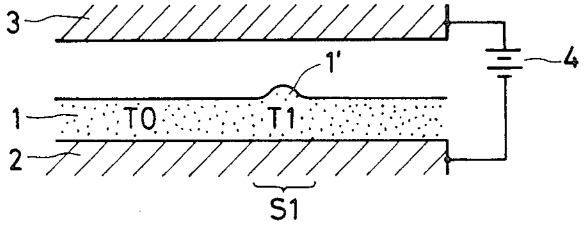
Figure 2C:
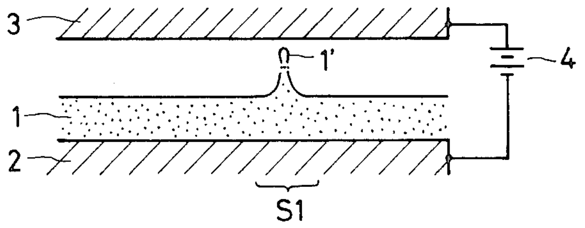

Referring now to FIGS. 2(A)–2(C), the recording principle of the image recording head according to the present invention will be described. As shown in FIG. 2(A), a liquid coloring agent 1 is arranged between a base electrode 2 and an opposite electrode 3. Preferably, the liquid coloring agent 1 is ink (hereinafter referred to as simply the "ink 1") having a proper electrical resistance and being a liquid at operating temperature. The base electrode 2 and the opposite one 3 are both conductive plates.

A d.c. power supply 4 applies voltage across the electrodes 2 and 3 to provide a fixed static electric field to the ink 1. Through static inductive action, the Coulomb force resulting from the sum of the inductive charge and the static electric field acts on the free surface of the ink to stimulate jetting of the ink 1 in a direction 5.

On the other hand, the surface tension, interfacial tension, and viscosity resistance of the ink act as drag to prevent jetting. FIG. 2(A) shows the state in which the drag is greater than the Coulomb force and therefore, the surface of the ink remains flat.

If the ink 1 is locally heated; that is, the temperature of an area S1 (FIG. (2B)) is raised to T1 which is higher than the temperature T0 of the remainder of the ink, the ink level in the area S1 will swell. This occurs as a result of a reduction of the drag in tne area S1 because of the higher ink temperature which allows the Coulomb force to dominate in the area $S_1$. The electric field becomes concentrated in the ink 1' and the action of the Coulomb force is further accelerated. Ultimately, the ink 1' in the area S1 forms a column as shown in FIG. 2(C) and a droplet will be jetted to to the opposite electrode 3. This phenomenon can be brought about rapidly without sharply heating the ink because the surface undergoes a phase change resulting from film boiling.

In other words, the selective application of thermal as well as electrical energies enables the controllable jetting of ink droplets. Both the location and timing of jetting can be controlled by the method and apparatus of the present invention.

The aforesaid principle was be demonstrated through the following experiments. The ink 1 was arranged on the base electrode 2 as shown in FIG. 2(A) and, while the temperature thereof was kept constant, the voltage of the power supply 4 was gradually raised. When the voltage exceeded a certain level, an ink column 1' shown in FIG. 2(C) began to grow randomly toward the opposite electrode 3. This phenomenon is explained as the growth of an unstable electrical fluid mechanical wave in "FIELD.COUPLED SURFACE WAVES"; pp 61 66, J. R. Melcher (M. I. T. Press).

In other words, the Coulomb force is locally concentrated in the perturbation (local unevenness in the liquid level) caused by the electric field. When the Coulomb force overcomes the drag, an ink column will grow.

According to the present invention, the strength of the electric field is selected to be insufficient to cause an ink column to grow randomly when the ink is at room temperature. The ink is heated to reduce the surface tension and viscosity of the ink at selected locations. As a result, ink columns were produced without increasing the electric field. Each ink droplet thus caused to jet was attracted toward a recording member, e.g., paper, so that one dot could be recorded. Images can be recorded by arranging many dots is a selected pattern.

Figure 1:
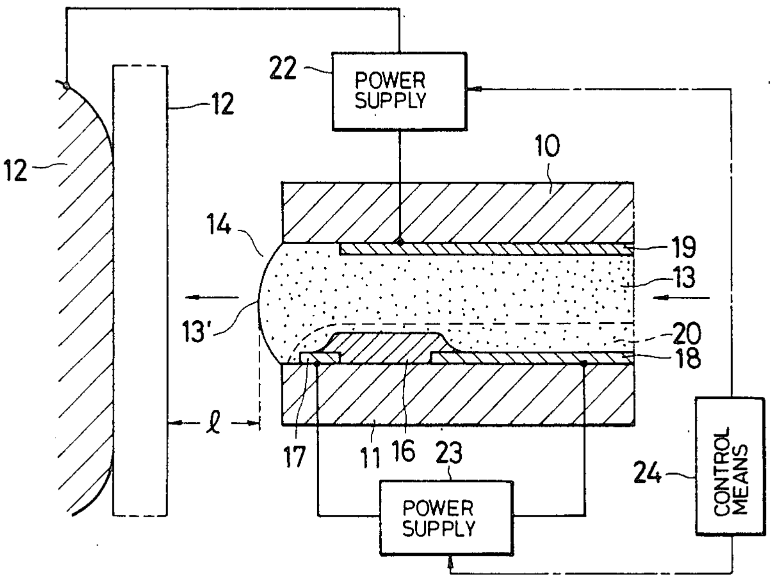
FIG. 1 is a vertical sectional view of an image recording head embodying the present invention.

As shown in FIG. 1, a pair of wall members 10, 11 are arranged so that one edge of each faces a recording member 12. The recording member 12 is a sheet of ordinary recording paper, e.g., paper used in a conventional copying machine.

The pair of wall members 10, 11 are arranged a fixed space apart and a liquid coloring agent 13 is provided therebetween. The edges of the wall members 10, 11 set opposite to the recording member 12 form a slit having a width in the direction parallel to the paper surface. The slit portion forms a discharge opening 14. The liquid coloring agent 13 forms a convex face 13' at the discharge opening because of its surface tension.

A number of heating resistors 16 may be installed on the inner face of one wall member 11, the heating resistors being arranged in an array perpendicular to the paper surface. An electrode 17 common to the heating resistors 16 is connected to one end of each of them, whereas lead electrodes 18 are connected to the other ends of the resistors. A heat-resistant insulating layer 20 may cover the heating resistors 16 and the electrodes 17 and 18. Moreover, substantially the whole inner face of the other wall member 10 is covered with an electric field forming electrode 19.

Figure 3:
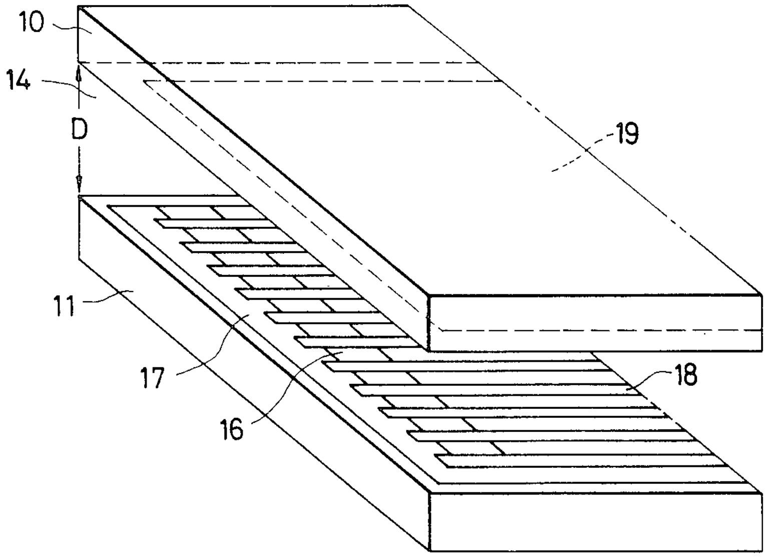
FIG. 3 is a perspective view of a principal portion of the embodiment of FIG. 1.

Referring to FIG. 3, the heating resistors 16 set in the array may be constructed in the same manner as heating elements in a known thermal head. Such an edge type thermal head may, for example, record with a density of 8 dots/mm on thermal recording paper having a color development temperature of about 90° C. When a recording is made on the thermal recording paper, power of 0.5 W/dot is supplied to each heating resistor for 1 msec. The space D selected between the pair of wall members 10, 11 may be set at 100 μm.

As shown in FIG. 1, the gap l between the discharge opening 14 and the recording member 12 was set at 200 μm, and the gap between the discharge opening 14 and the end of the heating resistors was also set at 200 μm. Further, a backing or opposite electrode 21 was provided to support the rear face of the recording member 12 and a power supply 22 applied a fixed voltage across the electrodes 19 and 21. For example, the electric field forming electrode 19 was grounded and +1,500 V was applied to the opposite electrode 21 to embody the electric energy applying means.

A power supply 23 was also connected to the electrodes 17, 18 on the ends of each of the heating resistors 16, to embody the thermal energy applying means. A control means 24 was connected to the power supplies 22, 23 so that the energy was switched on/off depending on the image signal representing an image being recorded. The control means 24 was formed with a circuit constituted by a shift register driver of the type known for driving thermal heads and the like.

As the liquid coloring agent 13 in this example, the ink used contained about 15% by weight of carbon-black pigment dispersed in liquid paraffin, with volume resistivity at 20° C. being about $1.0\times10^{6}\Omega\cdot cm$, viscosity being 300 cp, and surface tension being 70 dyne/cm.

When the voltage derived from the power source 22 was applied across the electric field forming electrode 19 and the opposite electrode 21 in the recording head thus constructed, the liquid coloring agent located close to the discharge opening 14 was subjected to a uniform electric field. At this time, the heating resistor 16 was energized at 15 V for 1 msec and 2,000 V/300 μm was applied at the same time across the opposite electrode 21 and the electric field forming electrode 19.

Only a droplet of ink 13 located close to a heating resistor 16 that was supplied with current was allowed to be jetted at the recording member 12 and a circular dot about 150 μm in diameter was recorded on the recording surface. Acceptable recording was also accomplished when the energizing time interval was shortened to 200 μsec.

When ink having volume resistivity of about $10^{5}\Omega\cdot cm$ was used, on the other hand, the ink was often seen not to jet out. This phenomenon is considered attributable to the fact that the heating resistor was insufficiently heated because of a leak across the adjacent lead electrodes 18.

Trial heating resistors were made, each covered with heat resistant insulating layers 20 shown by a broken line of FIG. 1. In the case of this image recording head, the surface of each lead electrode 18 is insulated and thus prevented from directly contacting the ink. Accordingly, no leak occurred. However, the heating resistor 16 had to be supplied with voltage at 20 V for 4 msec and the application of an electric field of 2,000 V/300 μm was required for 4 msec. In other words, efficiency in transferring heat to the ink was reduced because of the heat resistant insulating layer. Accordingly, it was actually demonstrated that high-speed recording could be carried out by efficiently heating the ink without the heat resistant insulating layers provided the ink had a resistance of $10^{6}\Omega\cdot cm$ or greater.

When the above operation was conducted without voltage being applied across the electric field forming electrode 19 and the opposite electrode 21, the ink was not jetted. When the voltage being applied across the electric-field forming electrode 19 and the opposite electrode 21 was raised without supplying the current to the heating resistor 16, the ink 13 was jetted through the discharge opening 14 randomly at a voltage level exceeding 3,000 V.

Since the ink is caused to jet by simultaneously and selectively applying the electric and thermal energies to the liquid coloring agent, there exist clearly defined conditions, i.e., threshold values, under which ink is jetted.

Figure 4A:
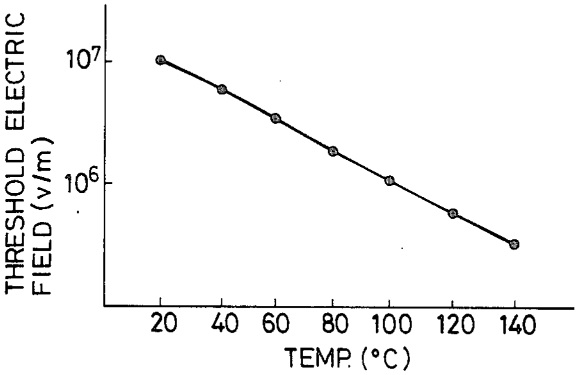
FIGS. 4(A)–4(D) are graphs showing the dependence of the threshold value of an electric field on temperature and ink properties.
Figure 4B:
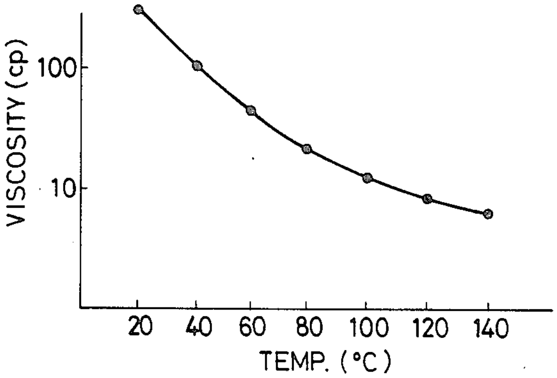
Figure 4C:
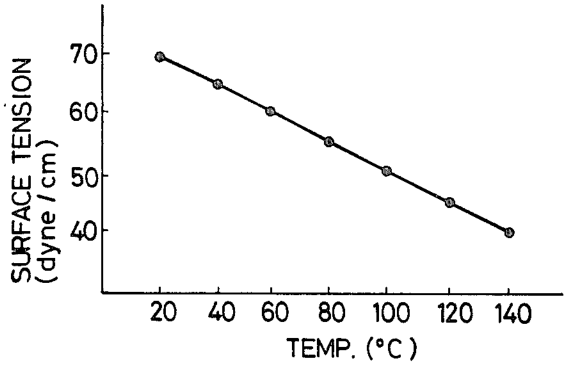
Figure 4D:
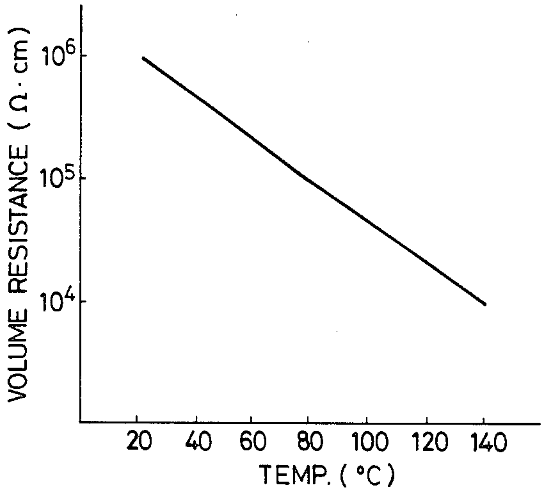

FIGS. 4(A)–4(D) are graphs showing the results of experiments intended to find the threshold values. According to the data shown in FIG. 4(A), the higher the ink temperature, the lower the value of the threshold electric field to accomplish jetting. As shown in FIG. 4(B), the viscosity of the ink decreases as the ink temperature rises like the case of the threshold electric field. The same trend is observed in the cases of the surface tension (FIG. 4(C)) and specific volume resistance (FIG. 4(D)). As is obvious from the experiments, the aforesaid threshold value of the electric field is greatly affected by these factors. In other words, the threshold value for the electric field value decreases as the temperature rises as a result of combined effects resulting from changes in physical properties including the viscosity, surface, tension and electrical conductivity of the ink.

Figure 5:
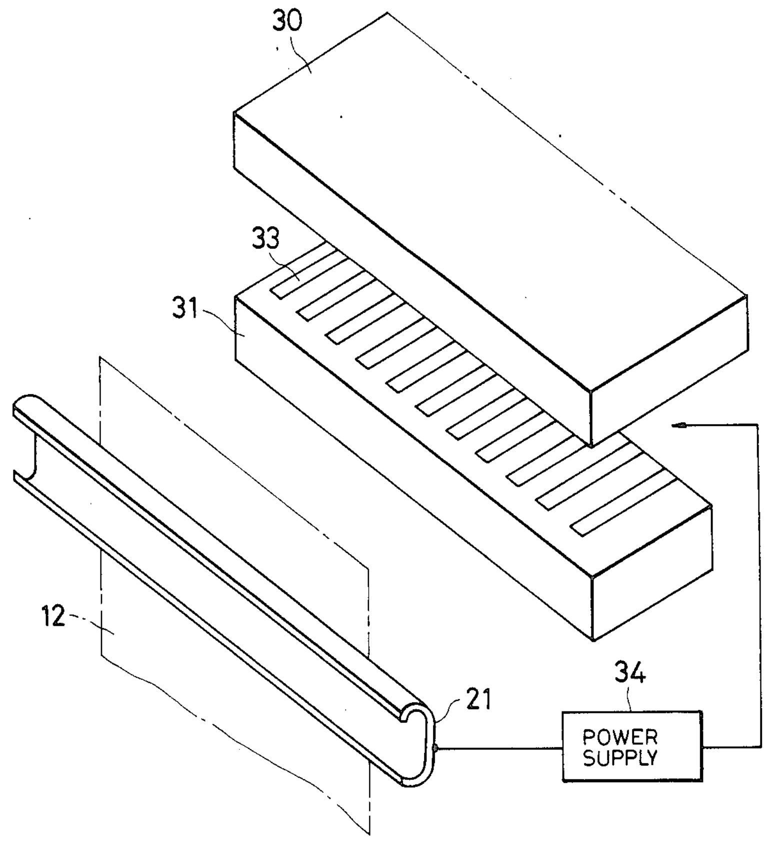
FIG. 5 is a perspective view of a modified recording head embodying the present invention.

FIG. 5 shows the principal portion of an example of a modified recording head according to the present invention. In FIG. 5, a number of electric-field forming electrodes 33 are arranged in array on the inner face of a wall member 31 opposite to a wall member 30. Ink is contained between the wall members 30, 31 and uniformly heated by a thermal energy applying means (not shown).

A backing or opposite electrode 21 supports the rear face of a recording member 12 and a power supply 34 applies a voltage between the opposite electrode 21 and the electric field forming electrodes 33. The power supply 34 is used to apply a fixed voltage to selected electric field forming electrodes 33. An electric field is thus produced to cause ink to jet from the selected electric field forming electrode 33 recovery the voltage toward the opposite electrode 21. Consequently, recording in response to image signals used to select the electrode 33 to receive voltage can be made on a recording member 12. Recording can be carried out in the same manner by controlling the position to which the electric energy is applied. In this embodiment, the advantage is that the ink is caused to jet at a relatively low voltage since the ink is already heated. In this embodiment also, a voltage leak across the electric field forming electrodes selectively supplied with voltage can be prevented by the use of ink having a sufficiently high electrical resistance.

Figure 6:
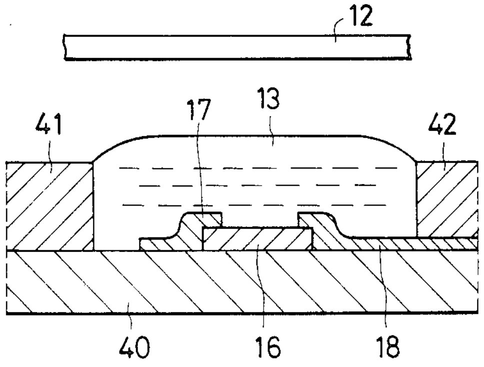
FIG. 6 is a vertical sectional view of another embodiment of the present invention.

FIG. 6 shows the principal portion of another recording head embodying the present invention. In this embodiment, heating resistors 16 are arranged on a horizontal base 40 in an array in the same manner as in the case of FIG. 1. Ink 13 is contained by transversely installed damlike members 41, 42 on either side of and rising above the heating resistors 16. A recording member 12 is arranged above the ink 13 with its recording face turned downward and an electric energy applying means (not shown) is used to form an electric field in the direction perpendicular to the base 40.

When current is supplied to the heating resistors 16 in the recording head thus constructed to generate heat, the ink is jetted vertically at the recording member 12 according to the same principles described above.

In the method and apparatus for recording images according to the present invention, temperatures are used at which the ink and the heating resistors do not undergo unsatisfactory thermal deterioration and voltages are applied at levels at which no leakage is caused across the electrodes. In addition, the means for containing the ink may be relatively simple in construction and thus need no complicated precise mechanism. Moreover, since the thermal energy as well as the electric energy required to be applied are relatively low in level, the size of the driving circuit can be made compact.

According to the present invention, shorting across the electrodes can be prevented by the use of a liquid coloring agent offering electric resistance greater than a definite level even if the liquid coloring agent makes direct contact with the heating resistors set in an array and the lead electrodes. The insulating layer on each lead electrode thus becomes unnecessary and the liquid coloring agent can be heated more efficiently. Consequently, the ink temperature rise is rapid to enable higher-speed recording.

From the foregoing description of the present invention, various modifications variations and equivalent structures will be apparent to those skilled in the art. Such modifications, variations, and structures are intended to be encompassed within the scope of the appended claims and their equivalents.

What is claimed is:

1. A method for recording images by jetting a liquid coloring agent at a recording medium supported by a backing electrode comprising the steps of:

providing an array of spaced-apart electric resistance heaters;

providing a liquid coloring agent in contact with the heaters;

applying an electric field to the liquid coloring agent at a level insufficient to cause jetting of the liquid coloring agent at room temperature; and applying current to selected electric resistance heaters to heat discrete locations of the liquid coloring agent to a temperature such that liquid coloring agent is jetted from the discrete locations toward the backing electrode.

2. A method according to claim 1, wherein said step of applying on electric field comprises providing a driving electrode in contact with the liquid coloring agent and establishing a voltage drop between the driving electrode and the backing electrode.

3. A method according to claim 2, wherein said step of providing a liquid coloring agent comprises the step of providing ink with a volume resistivity of at least $10^6 \Omega \cdot cm$.

4. An image recording apparatus adapted to apply both electric and thermal energies to a liquid coloring agent to jet droplets of the liquid coloring agent toward a backing electrode adapted to support a recording medium comprising:

electric energy applying means including an electric field forming electrode;

a first power supply for establishing a voltage drop between the electric field forming electrode and the backing electrode to produce an electric field having a level less than the level required to jet liquid coloring agent toward the backing electrode;

thermal energy applying means including a plurality of heating elements in contact with the liquid coloring agent; and second power supply means for selectively energizing said heating elements to raise the temperature of the liquid coloring agent in the area of said energized heating elements to jet droplets of said liquid coloring agent under the influence of said electric field.

5. An image recording apparatus according to claim 4, wherein the liquid coloring agent comprises ink having a volume resistivity of at least $10^6 \Omega \cdot cm$.

* * * * *